(12) United States Patent
Izraeli et al.

(10) Patent No.: US 11,864,076 B2
(45) Date of Patent: Jan. 2, 2024

(54) PAIRING BASED DETECTION OF A CAR THEFT

(71) Applicant: Traffilog LTD., Rosh-Haayin (IL)

(72) Inventors: Robert Izraeli, Holon (IL); Adi Amihai, Kibutz Gan Shlomo (IL); Assi Bitton, Herzeliya (IL); Arik Greenberger, Binyamina (IL)

(73) Assignee: Traffilog Ltd., Rosh-Haayin (IL)

( * ) Notice: Subject to any disclaimer, the term of this patent is extended or adjusted under 35 U.S.C. 154(b) by 191 days.

(21) Appl. No.: 16/946,443

(22) Filed: Jun. 22, 2020

(65) Prior Publication Data
US 2020/0322771 A1    Oct. 8, 2020

Related U.S. Application Data

(63) Continuation of application No. 14/991,969, filed on Jan. 10, 2016, now abandoned.

(51) Int. Cl.
*H04W 4/80* (2018.01)
*H04W 4/48* (2018.01)
*H04W 4/02* (2018.01)

(52) U.S. Cl.
CPC .............. *H04W 4/80* (2018.02); *H04W 4/023* (2013.01); *H04W 4/48* (2018.02)

(58) Field of Classification Search
CPC .......... B60R 2325/205; B60R 2325/10; B60R 25/2009; B60R 25/33; H04W 4/008; G08B 25/00
See application file for complete search history.

(56) References Cited

U.S. PATENT DOCUMENTS

| | | | |
|---|---|---|---|
| 2007/0082614 A1* | 4/2007 | Mock | H04W 88/02 455/41.2 |
| 2011/0086678 A1 | 4/2011 | Suzuki | |
| 2013/0021145 A1* | 1/2013 | Boudy | G08B 13/1427 340/426.11 |
| 2015/0172450 A1 | 6/2015 | Singhal | |
| 2015/0256999 A1* | 9/2015 | Doorandish | H04W 4/80 455/419 |

* cited by examiner

*Primary Examiner* — Charles J Han
(74) *Attorney, Agent, or Firm* — Reches Patents

(57) ABSTRACT

A method for monitoring a vehicle, the method may include determining, by a computer, whether a pairing between a vehicle and a mobile device associated with the vehicle succeeded; applying, by the computer, a first monitoring process when the pairing succeeded; and applying, by the computer, a second monitoring process that differs from the first monitoring process when the pairing failed.

16 Claims, 13 Drawing Sheets

PAIRING BASED DETECTION OF A CAR THEFT

This application is a continuation of U.S. patent application Ser. No. 14/991,969 filing date Jan. 10, 2016 which is incorporated herein by reference.

BACKGROUND

Large amount of cars are stolen each year. The amount of stolen cars rapidly increases thereby imposing an increased burden on insurance companies and ultimately on the drivers.

There is a growing need to detect car thefts as soon as possible thereby increasing the probability of finding the stolen cars.

SUMMARY

According to an embodiment of the invention various methods may be provided and are described in the specification.

According to various embodiments of the invention there may be provided a non-transitory computer readable medium that may store instructions for performing any of the methods described in the specification and any steps thereof, including any combinations of same.

Additional embodiments of the invention include a system arranged to execute any or all of the methods described in the specification above, including any stages—and any combinations of same.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
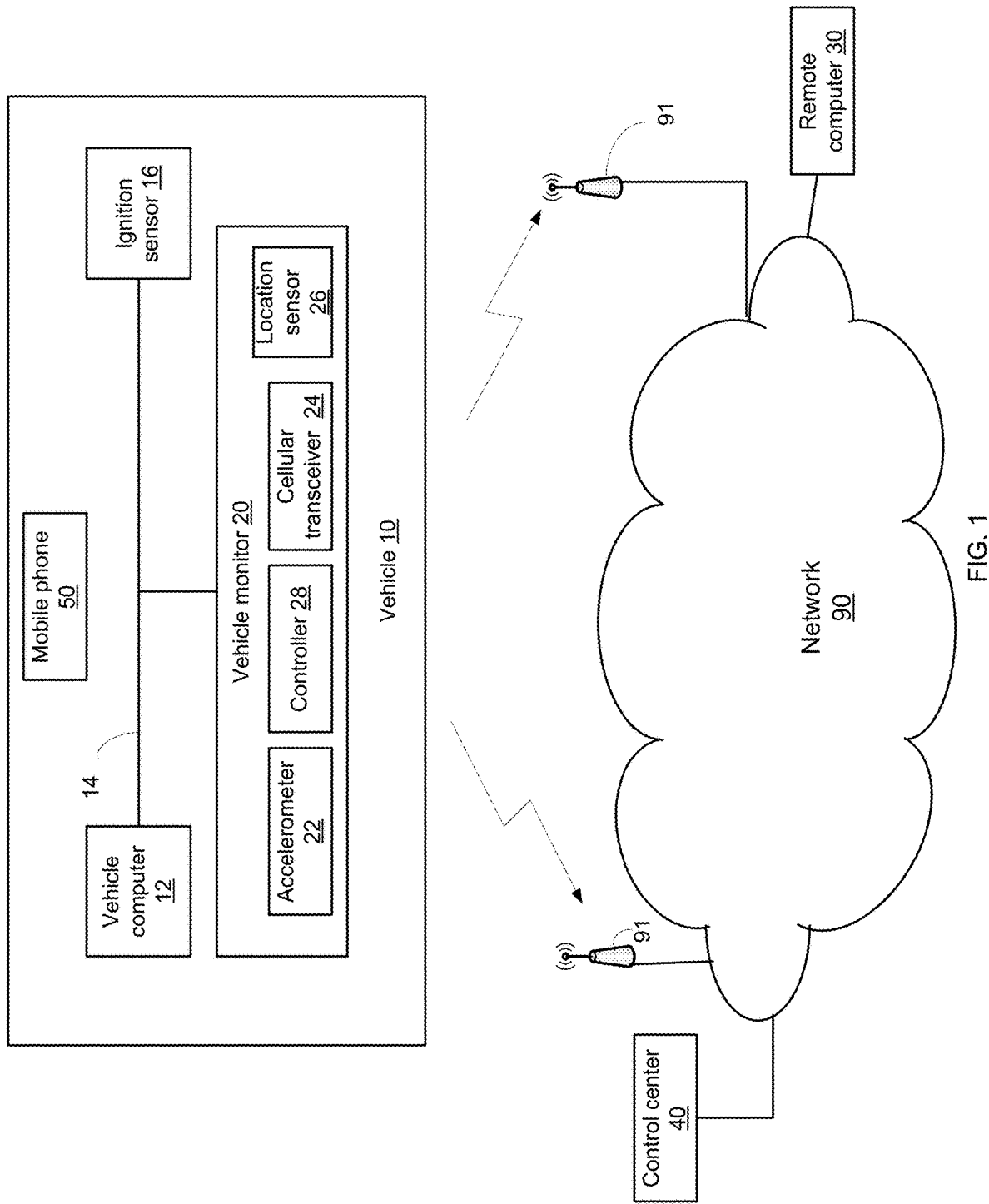
FIG. 1 illustrates a vehicle, a vehicle monitor, a remote computer, a control center, a network and a cellular phone of a driver of the vehicle according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Pairing-Based Car Theft Monitoring.

The terms "mobile" and "cellular" are used in an interchangeable manner. A cellular network may be a long range wireless network. A cellular phone is a non-limiting example of any mobile device. Yet other examples include a satellite phone, a communication and/or entertainment device that differ from a mobile phone, a wearable communication device, an implanted communication device, and the like.

The term "cellular phone of the driver" is a non-limiting example of a mobile device that is associated with the vehicle. The association may result in information about vehicles and persons that are allowed to drive the vehicle or otherwise be within the vehicle when an activity related to the can is executed. The activity may include igniting the car, attempting to ignite the car, driving the car, closing or opening a door or window of the car, and the like. The activity may be sensed by an activity sensor. The activity sensor may be located within the vehicle or outside the vehicle. The activity sensor may be, for example, a motion sensor, a radar, an acoustic sensor, an accelerometer, an ignition sensor, a camera, a door or window status sensor (such as a door position sensor), a vehicle computer, an acoustic sensor, a vibration sensor, a speed sensor, a location sensor and the like.

Figure 10:
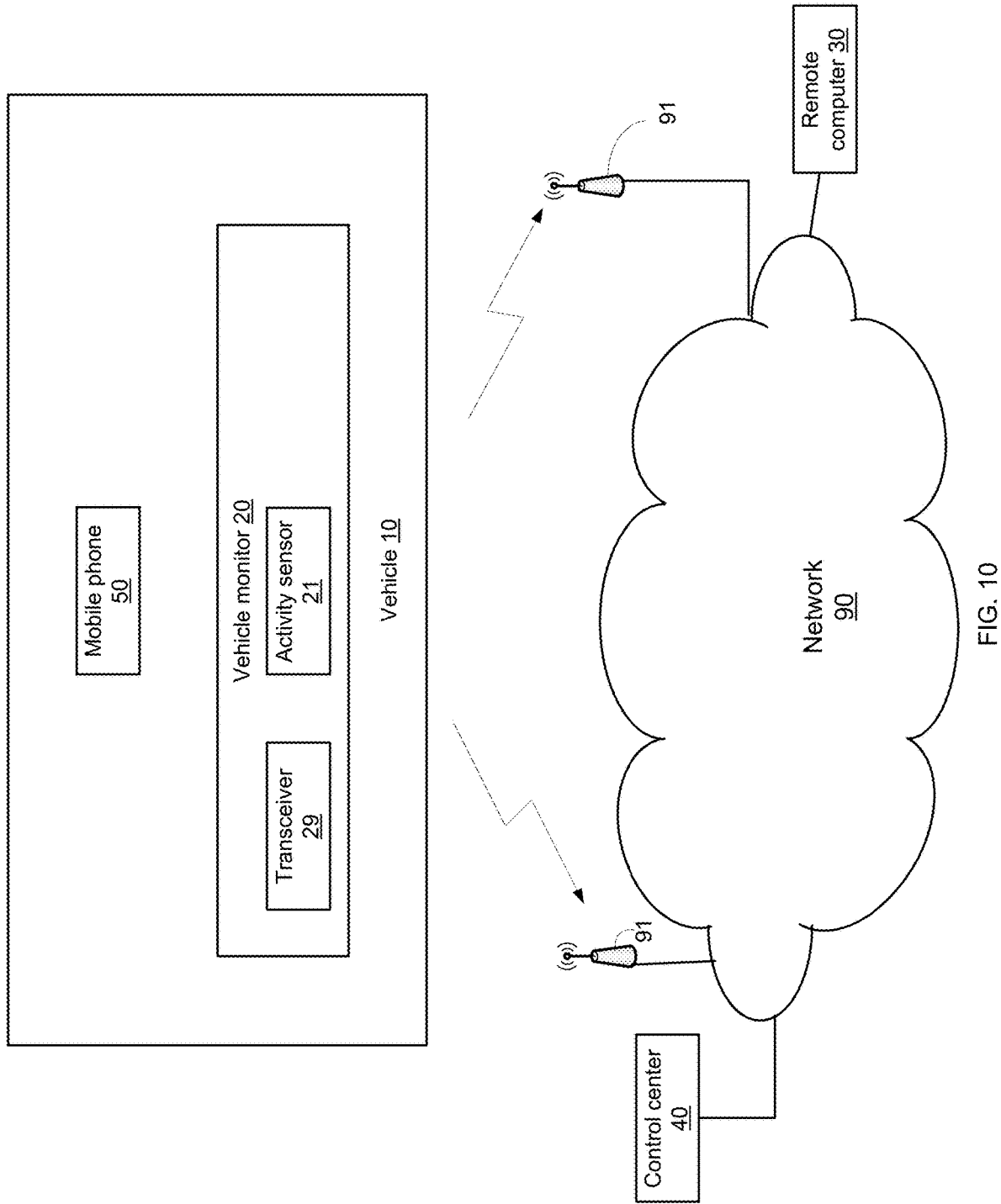
FIG. 10 illustrates a vehicle, a vehicle monitor, a remote computer, a control center, a network and a cellular phone of a driver of the vehicle according to an embodiment of the invention.
Figure 11:
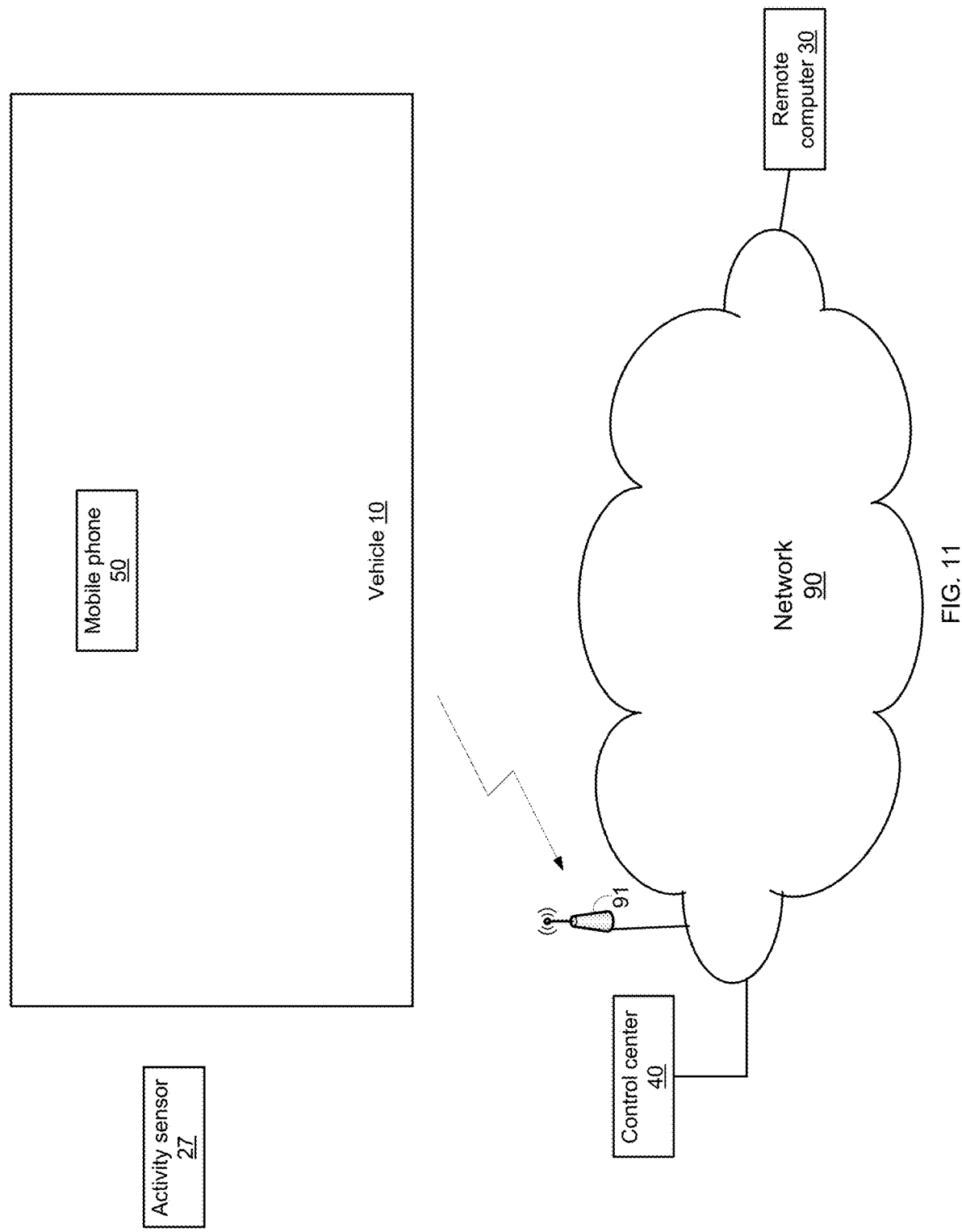
FIG. 11 illustrates a vehicle, a remote computer, a network and a cellular phone of a driver of the vehicle according to an embodiment of the invention.
Figure 12:
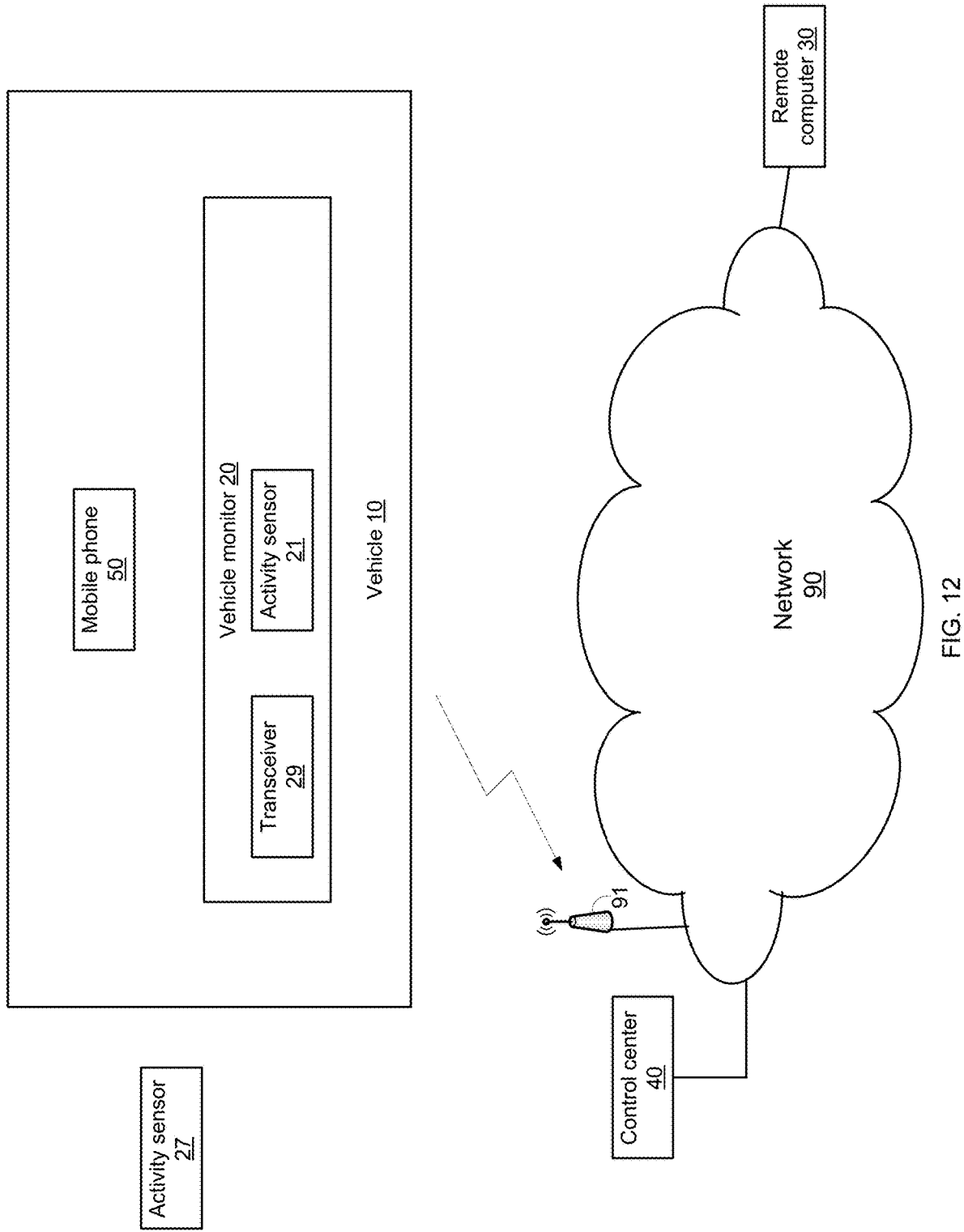
FIG. 12 illustrates a vehicle, a vehicle monitor, a remote computer, a control center, a network and a cellular phone of a driver of the vehicle according to an embodiment of the invention.
Figure 13:
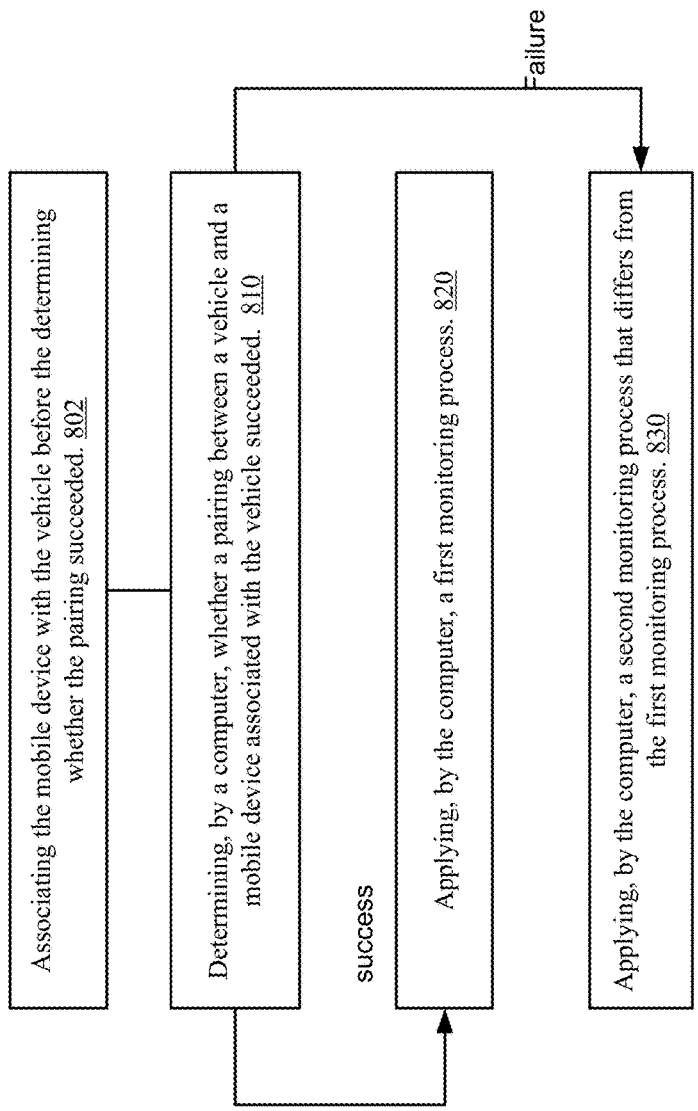
FIG. 13 illustrates a method according to an embodiment of the invention.

FIG. 10 illustrates an activity sensor 21 that is located within the vehicle 10 and is part of a vehicle monitor 20 that also includes a transceiver 29. The transceiver may be any type of transceiver and may be, for example, a cellular transceiver, a satellite transceiver, a LAWN transceiver, and the like. FIG. 11 illustrates an activity sensor 27 that is located outside a vehicle 10. FIG. 12 illustrates an activity sensor 27 that is located outside vehicle 10 and an activity sensor 21 located within vehicle. Activity information from one or more of these activity sensors may be used during the pairing process. For example—activity information may trigger the pairing, may trigger the provision of vehicle information to remote computer 30, and the like. Yet for another example—the activity information may be used during the pairing—for example to start a time window during which the pairing should succeed. In FIGS. 10-12 the mobile phone 50 is located within vehicle 10 and the vehicle 10 may communicate within network 90 via one or more network cells 91. It is noted that control center 40 is optional. Alternatively, remote computer 30 may reside within the control center or located elsewhere.

According to an embodiment of the invention there is provided a system, method and a computer readable medium for pairing based monitoring of a vehicle.

FIG. 1 illustrates vehicle 10, vehicle monitor 20, remote computer 30, control center 40, network 90 and cellular phone 50 of a driver of the vehicle according to an embodiment of the invention.

Vehicle monitor 20, cellular phone 50, control center 40 and remote computer may be linked to one or more networks such as network 90. Network 90 may be a wireless network, a combination of one or more wired and wireless networks may be the Internet, a local area network, a wide area network, and the like. In FIG. 1 two network cells 91 relay information between network 90, cellular phone 50 and vehicle monitor 20.

In FIG. 1 it is assumed that the driver is a registered user of the vehicle. The list of registered users may be determined in advance, by following a registration process. The list of registered users may include one or more users. Remote computer 30, control center 40 and/or vehicle monitor 20 can access the list of registered users.

Remote computer 30 is a computer that is located remotely from the vehicle 10. Remote computer 30 can be a computer that is within a cloud environment, may be a server, multiple computers and the like. Remote computer 30 may be located within the control center 40 or be located elsewhere.

Control center 40 may be coupled to one or more remote computers 30 and may monitor multiple vehicles. Control center 40 can be a manned control center or an unmanned control center. Control center 40 may be configured to communicate with the police or with other emergency services.

Vehicle 10 includes a vehicle computer 12 that controls the vehicle 10 under the instructions of the driver. The vehicle computer 12 may be coupled to various sensors over vehicle communication link 14 such as but not limited to CanBus. FIG. 1 illustrates an ignition sensor 16 that is coupled to the vehicle computer 12.

Vehicle monitor 20 includes accelerometer 22, cellular transceiver 24, location sensor 26 and controller 28.

A non-limiting example of vehicle monitor 20 may be the TraffiView™ of Traffilog Ltd. of Israel.

Vehicle monitor 20 may be installed in the vehicle 10 and be used for remote monitoring of the vehicle 10.

Accelerometer 22 may sense accelerations and decelerations of vehicle 10. The acceleration and/or deceleration information sensed by accelerometer 22 may be used to calculate the velocity of vehicle 10.

Cellular transceiver 24 may communicate over a cellular or wireless network. Additionally or alternatively, cellular transceiver 24 may communicate over a wireless link with cellular phone 50. This wireless link may be a BLUETOOTH compliant wireless link or any other link.

Location sensor 26 may sense the location of the vehicle 10. Locations sensor 26 may use global positioning system (GPS) technology or any other location technology. Additionally or alternatively, location sensor 26 may generate location information based on cellular network information such as but not limited to the identity of one or more cellular cells received by the cellular transceiver and/or the strength of signals received from these one or more cellular cells. Location sensor 26 may be configured to perform a cellular network based triangulation in response to the strength of signals received from these one or more cellular cells.

Vehicle monitor 20 may receive information from vehicle computer 12 and/or from any sensor coupled to the vehicle computer 12. The reception of information may include intercepting messages sent over vehicle communication link 14 or may include receiving information in any other manner.

Vehicle monitor 20 may, for example, receive an ignition indicator and in response try to perform a pairing process with the cellular phone 50.

If the pairing process succeeds then vehicle monitor 20 may send a successful pairing indicator to at least one out of remote computer 30, cellular phone 50 and control center 40.

If the pairing process fails then vehicle monitor 20 may send a pairing failure indicator to at least one out of remote computer 30, cellular phone 50 and control center 40.

Cellular phone 50 can host an application that may generate an audio and/or visual notification upon a reception of successful pairing indicator and/or a successful pairing indicator.

According to another embodiment of the invention, cellular phone 50 can receive from vehicle monitor 20 a vehicle ignition indication and initiate a pairing process with vehicle monitor 20.

A pairing process may include requesting the driver to provide a predefined pairing code to the cellular phone 50 and the pairing code may be sent to the vehicle monitor 20. Alternatively, the pairing code is provided by the driver during a registration process and is stored in the cellular phone 50. During a pairing process, cellular phone 50 retrieves the pairing code and sends it to the vehicle monitor 20.

Figure 2:
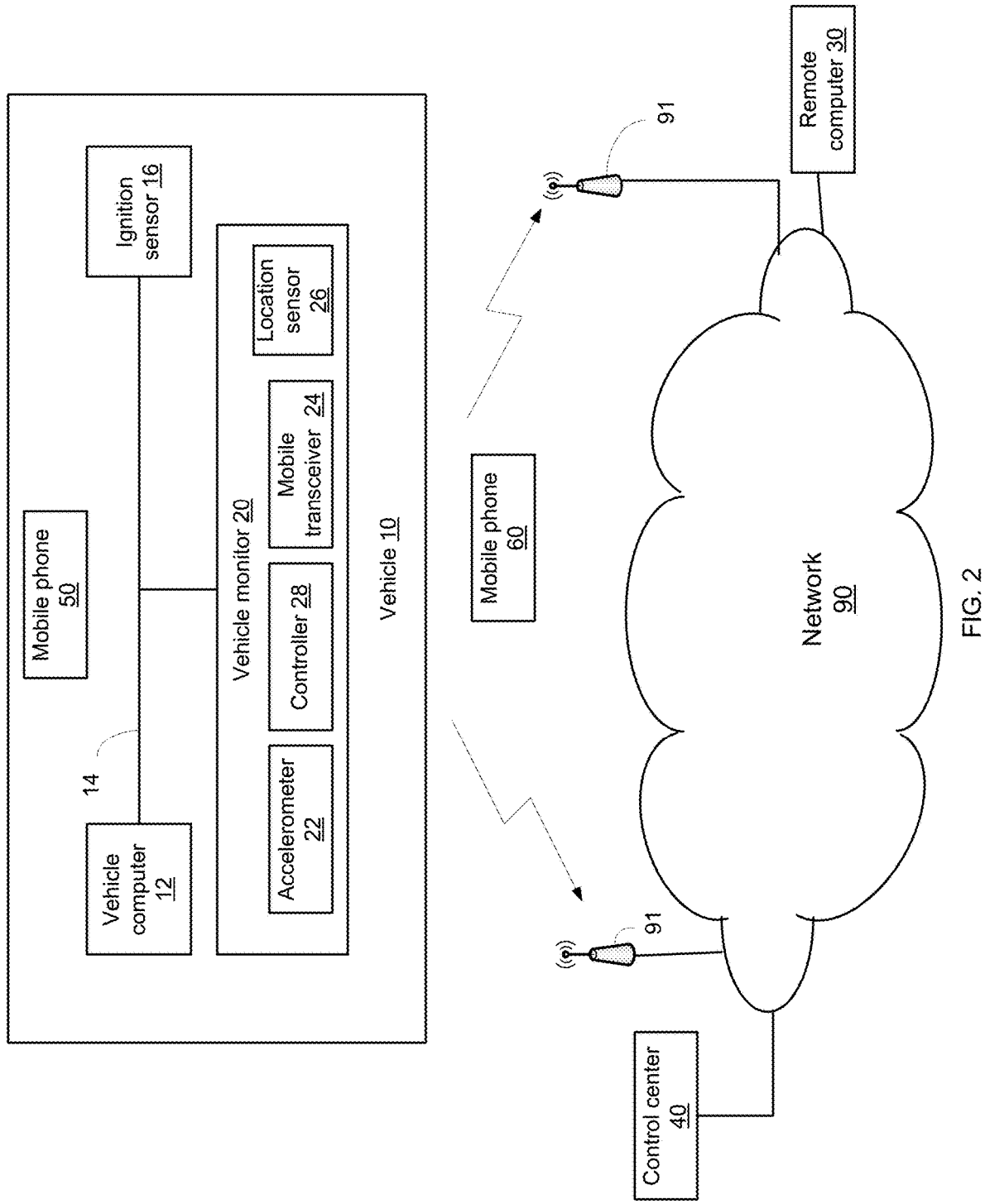
FIG. 2 illustrates a vehicle, a vehicle monitor, a remote computer, a control center, a network, a cellular phone of a registered user that is not a driver of the vehicle and a cellular phone of a driver of the vehicle according to an embodiment of the invention.

FIG. 2 illustrates a vehicle 10, a vehicle monitor 20, a remote computer 30, a control center 40, a cellular phone 50 of a driver of the vehicle and a cellular phone 60 of a registered user, according to an embodiment of the invention.

In FIG. 2 it is assumed that the driver is not a registered user of the vehicle 10 and that the cellular phone 60 of the registered user is not within vehicle 10.

Under this scenario the pairing will fail.

Cellular phone 60 will receive notifications and/or alerts from remote computer 30 and/or vehicle monitor 20 and/or control center 40.

Figure 3:
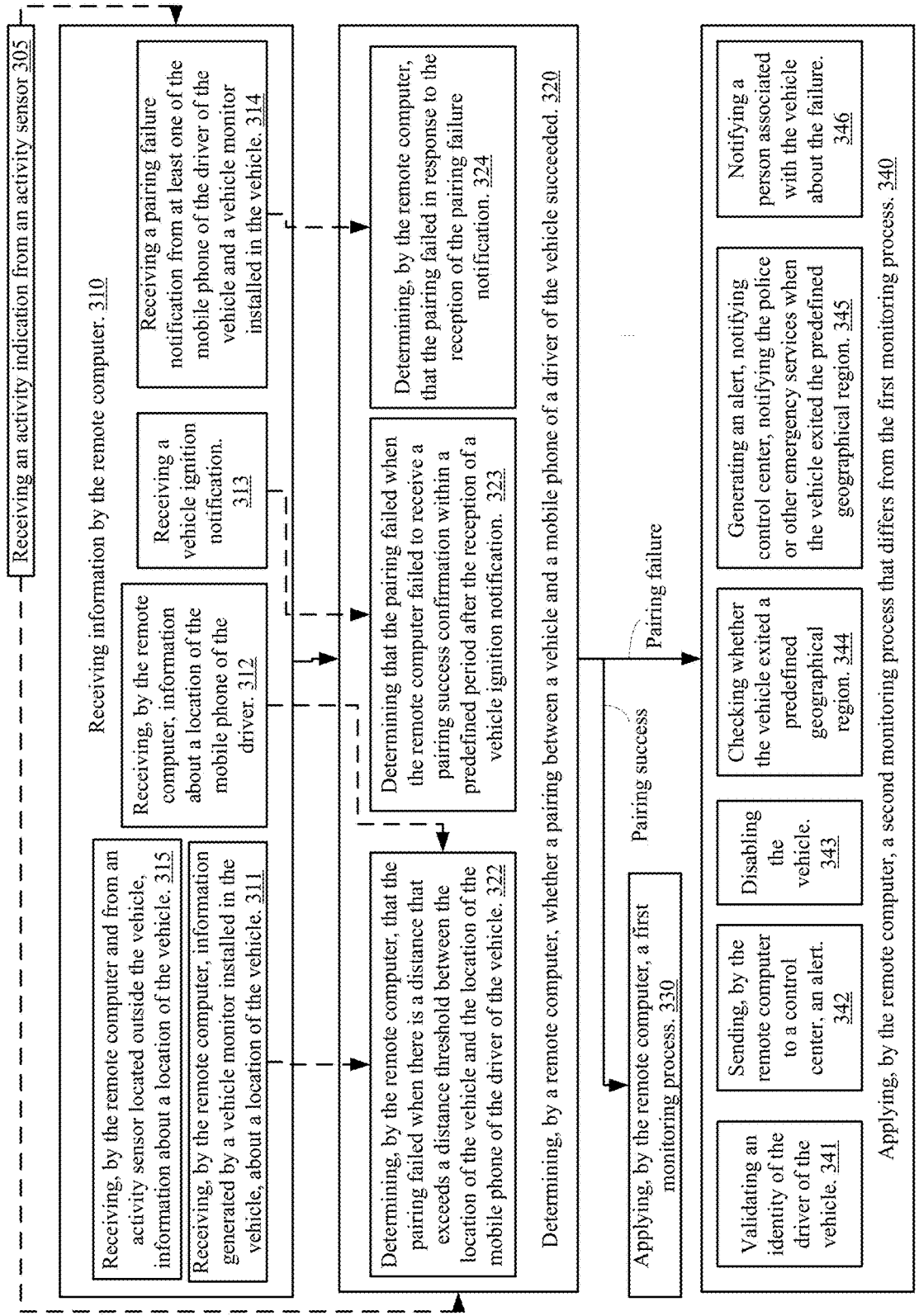
FIG. 3 illustrates a method according to an embodiment of the invention.

FIG. 3 illustrates method 300 according to an embodiment of the invention.

Method 300 is executed by a remote computer.

Method 300 may start by step 305 of receiving an activity indication from an activity sensor. The activity indication indicates that there is an activity related to the vehicle.

The activity may include igniting the car, attempting to ignite the car, driving the car, closing or opening a door or window of the car, and the like. The activity may be sensed by an activity sensor. The activity sensor may be located within the vehicle or outside the vehicle. The activity sensor may be, for example, a motion sensor, a radar, an acoustic sensor, an accelerometer, an ignition sensor, a camera, a door or window status sensor (such as a door position sensor), a vehicle computer, an acoustic sensor, a vibration sensor, a speed sensor, a location sensor and the like.

Step 305 may be followed by step 310 and/or step 320.

Step 310 may include receiving information by the remote computer.

Step 310 may be followed by step 320 of determining, by a remote computer, whether a pairing between a vehicle and a cellular phone of a driver of the vehicle succeeded.

Step 310 may include steps 311, 312, 313, 314 and 315.

Step 311 may include receiving, by the remote computer, information about a location of the vehicle, wherein the information about the location of the vehicle is generated by a vehicle monitor installed in the vehicle.

Step 312 may include receiving, by the remote computer, information about a location of the cellular phone of the driver.

Step 315 may include receiving, by the remote computer and from an activity sensor located outside the vehicle, information about a location of the vehicle.

When step 310 includes steps 311 and 312 and/or step 315 then step 320 may include step 322 of determining, by the remote computer, that the pairing failed when there is a distance that exceeds a distance threshold between the location of the vehicle and the location of the cellular phone of the driver of the vehicle.

The information about a location of the vehicle may include an identity of cellular network cells sensed by the vehicle monitor.

Step 310 may include step 313 of receiving a vehicle ignition notification. This is a non-limiting example of an activity indication.

When step 310 includes step 313 then step 320 may include step 323 of determining that the pairing failed when the remote computer failed to receive a pairing success confirmation within a predefined period after the reception of a vehicle ignition notification.

Step 310 may include step 314 of receiving a pairing failure notification from at least one of the cellular phone of the driver of the vehicle and a vehicle monitor installed in the vehicle.

When step 310 includes step 314 then step 320 may include step 324 of determining, by the remote computer, that the pairing failed in response to the reception of the pairing failure notification.

If determining that the pairing succeeded then step 320 may be followed by step 330 of applying, by the remote computer, a first monitoring process.

The first monitoring process may include tracking the propagation of the vehicle, building a profile of the driving habits of the driver, and the like.

The first monitoring process may include wait for a predefined period to lapse and then attempt to verify the identity of the driver.

The first monitoring process may include requesting another type of pairing to occur.

If determining that the pairing failed then step 320 may be followed by step 340 of applying, by the remote computer, a second monitoring process that differs from the first monitoring process.

Step 340 may include step 341 of validating an identity of the driver of the vehicle.

Step 340 may include step 342 of sending, by the remote computer to a control center, an alert.

Step 340 may include step 343 of disabling the vehicle.

Step 340 may include step 344 checking whether the vehicle exited a predefined geographical region. The predefined geographical region may be defined by the driver, by the control center 40 or by an administrator of the remote computer 30. The predefined geographical region is a region in which the vehicle should be located. An exit of the vehicle 10 from the predefined geographical region may indicate that vehicle 10 is stolen. The predefined region can be defined in view of country or state boarders.

Step 344 may be followed by step 345 of generating an alert, notifying control center 40, notifying the police or other emergency services when the vehicle exited the predefined geographical region.

Step 340 may include step 346 of notifying a person associated with the vehicle about the failure.

Figure 4:
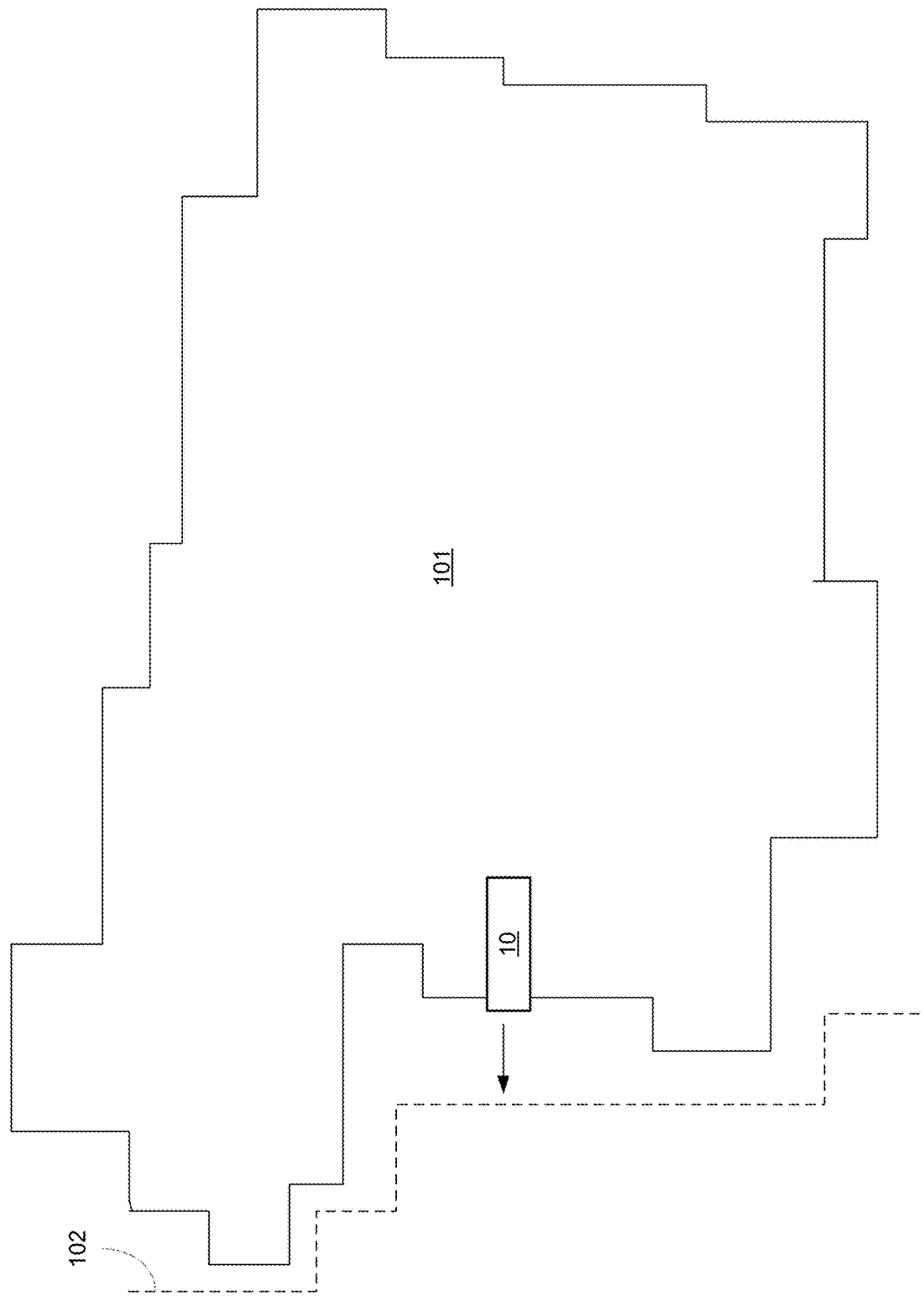
FIG. 4 illustrates a vehicle, a predefined geographical region and a state border 102 according to an embodiment of the invention.

FIG. 4 illustrates vehicle 10, predefined geographical region 101 and a state border 102 according to an embodiment of the invention.

FIG. 4 illustrates vehicle 10 that exits predefined geographical region 101 and propagates towards state border 102. This passage may trigger various responses—especially if the pairing between the vehicle and the cellular phone of the driver failed and identity of the driver was not verified as being an identity of a registered user of vehicle.

FIG. 12 illustrates method 800 according to an embodiment of the invention.

Method 800 may include step 802 of associating the mobile device with the vehicle before the determining whether the pairing succeeded.

Step 802 may include registering mobile devices to a vehicle. The registered mobile devices may belong to a person that is allowed to perform certain actions related to the vehicle. For example that person may be allowed to drive the vehicle, may be allowed to be within the vehicle when the vehicle is opened, closed, ignited or moves. The registration process may be executed in any known manner— especially any known manner that is safe and cannot be easily hacked or changed by an unauthorized person. The registration process can generate a data structure that stores vehicle identification information and identification information of one or more mobile device associated with the vehicle.

The mobile device may be a mobile phone of a driver that is associated with the vehicle.

Method 800 may include 810 of determining, by a computer, whether a pairing between a vehicle and a mobile device associated with the vehicle succeeded. The determining may be triggered by sensing an activity (see step 305 of FIG. 3).

Step 810 may include receiving by the computer, information about a location of the vehicle and receiving, by the computer, information about a location of the mobile device associated with the vehicle.

The information about the location of the vehicle may be generated by a vehicle monitor installed in the vehicle, by an activity sensor located inside and/or outside the vehicle.

Step 810 may include at least one of the following:
  a. Determining whether the pairing succeeded is responsive to a relationship between the location of the vehicle and the location of the mobile device associated with the vehicle of the vehicle.
  b. Determining that the pairing failed when a distance between the location of the vehicle and the location of the mobile device associated with the vehicle of the vehicle exceeds a distance threshold.
  c. Determining that the pairing failed when the computer failed to receive a pairing success confirmation within a predefined period after a reception of a vehicle ignition notification.
  d. Determining, by the computer, that the pairing failed upon a reception of a pairing failure notification from at least one of the mobile device associated with the vehicle of the vehicle and a vehicle monitor installed in the vehicle.

Step 810 may be followed by step 820 of applying, by the computer, a first monitoring process when the pairing succeeded.

Step 810 may be followed by step 830 of applying, by the computer, a second monitoring process that differs from the first monitoring process when the pairing failed.

Step 830 may include at least one of the following:
  a. Validating an identity of the driver of the vehicle.
  b. Sending, by the computer to a control center, an alert.
  c. Instructing the vehicle to be deactivated and/or deactivating various functions of the vehicle.
  d. Instructing the vehicle to generate an alert such as an audio visual alert. The audio visual alert may be generated in a manner that will be noticed by the surrounding of the vehicle and/or impose difficulties on the driver of the vehicle. For example—the vehicle may be instructed to blink its lights, to activate its horn, to repetitively change the position of one or more window of the vehicle, to maintain all windows of the vehicle open, to activate a multimedia device of the vehicle (music player, radio) at a volume that is high enough to be clearly heard from outside of the vehicle, and the like. The alert may be a pattern of actions that differs from a normal pattern. The audio visual alert may include alternating between high and low beams, activating the hazard blinker and the like.
  e. Checking whether the vehicle exited a predefined geographical region.
  f. Generating an alert (by the remote computer and maybe sending the alert to a control center) when the vehicle exited the predefined geographical region
  g. Notifying a person associated with the vehicle about the failure. The person may be the registered driver.

Any combination of any steps of methods 300, 500 and 800 may be provided.

Profile-Based Car Theft Detection

Figure 5:
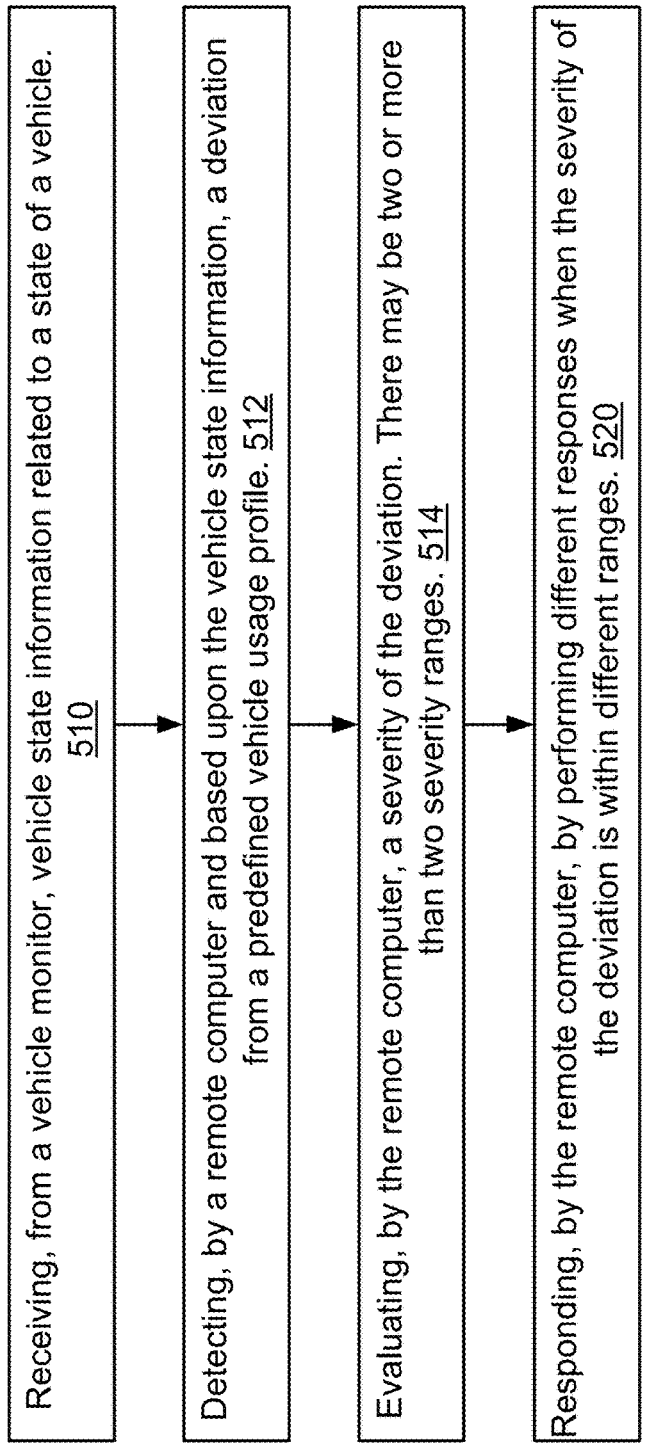
FIG. 5 illustrates a method according to an embodiment of the invention.

FIG. 5 illustrates a method 500 for monitoring a vehicle according to an embodiment of the invention.

Method 500 may be start by step 510 of receiving, from a vehicle monitor, vehicle state information related to a state of a vehicle.

The vehicle monitor may be coupled to the vehicle, installed within the vehicle or may be positioned outside the vehicle.

The state information may be indicative of a location of the vehicle, a speed of the vehicle, an acceleration of the vehicle, whether the vehicle was ignited or not, whether the vehicle monitor succeeded or failed to pair with a cellular phone of a driver of the vehicle. The state information may include or may be associated with timing information indicative of the time of acquisition of the status information.

Step 510 may be followed by step 512 of detecting, by a remote computer and based upon the vehicle state information, a deviation from a predefined vehicle usage profile.

The remote computer may be a server, a desktop computer, a server farm, a cloud environment computer, may be located within a manned or unmanned control center or coupled to a control center.

The remote computer may be located at any distance from the vehicle and may receive the vehicle state information via one or more networks such as wired and/or wireless networks.

According to an embodiment of the invention the predefined vehicle usage profile may be defined by an authorized person—such as a system administrator or an employer of the driver of the vehicle.

According to an embodiment of the invention the predefined vehicle usage profile defines allowable locations of the vehicle. For example, the predefined usage profile may define, as allowable locations the working place of the driver of the vehicle, the home of the driver, the path between the home and the working place of the driver, various geographical regions that are proximate to the working place and/or the home of the driver, and the like. Yet for another example, the predefined usage profile may define forbidden locations such as various countries, border crossings, and the like.

According to an embodiment of the invention the predefined vehicle usage profile may define combinations of allowable locations of the vehicle and time windows. For example—a driver may be expected to be at work during various hours/days/dates (workdays, during working hours) and may be expected to be at home during various hours/days/dates (holidays, weekends, nights).

According to an embodiment of the invention the predefined vehicle usage profile may define combinations of a group of allowable locations of the vehicle and a group of time windows and at least one forbidden location that is not associated with any time window. For example—the vehicle may be forbidden to exit a country of the driver regardless of any time window.

According to an embodiment of the invention the predefined vehicle usage profile may include information that is related to the manner in which the vehicle is operated. This information may be provided in addition to or instead of the location information.

For example—the predefined vehicle usage profile may define at least one allowable ignition sequence of the vehicle. The allowable ignition sequence may include a reception of a predefined code from a driver of the vehicle and a proper supply of power during a predefined period following the ignition sequence. A power supply failure that occurs during the ignition process may be indicative of an attempt to steal the vehicle. A failure to provide the predefined code may also be indicative of an attempt to steal the vehicle. A driver may occasionally feed in the wrong code-and may be given one or more attempts to feed the predefined code. Upon a failure in each one of the one or more attempts an alert may be generated.

Yet for example—the predefined vehicle usage profile may define a predefined code that is associated with the regular driver of the vehicle. When the vehicle is ignited with a predefined code of another driver—a deviation may be detected.

Yet for another example—the predefined vehicle usage profile may define a pairing process (see for example, method 300) between vehicle and a cellular phone of a driver of the vehicle.

According to an embodiment of the invention the evaluating of the severity of the deviation is responsive to an occurrence, within a predefined time frame, of at least one other deviation from the predefined vehicle usage profile.

For example—if the driver failed to provide, during an ignition sequence, the predefined code and the vehicle is about to enter a forbidden region—the severity of the latter deviation may increase.

According to an embodiment of the invention the deviations may belong to multiple types of deviations. The multiple types may include a first type of deviation and a second type of deviation.

For example—when the deviation is of a first type the evaluating of the severity the deviation is responsive to an occurrence, within a predefined time frame, of at least one other deviation from the predefined vehicle usage profile.

Yet for another example—when the deviation is of a second type the evaluating of the severity the deviation is ignorant of the occurrence, within the predefined time frame, of the at least one other deviation from the predefined vehicle usage profile.

According to an embodiment of the invention a deviation from the predefined vehicle usage profile may include a movement of the vehicle while the vehicle is not ignited. This may be indicative of the vehicle being towed or loaded on another vehicle. In this case the response to the deviation may include contacting the police or other municipal authorities to check whether the vehicle was towed or otherwise taken according to any law or regulations or whether it is being stolen. When the former occurs the remote computer may attempt to contact (or allow a user of the remote computer to contact) the police or other municipal authority in order to pay a fine or otherwise release the towed vehicle.

According to an embodiment of the invention a deviation from the predefined vehicle usage profile may include a failure of a pairing between the vehicle and a cellular phone of a driver of the vehicle.

According to an embodiment of the invention a deviation from the predefined vehicle usage profile may include a failure of the vehicle monitor to communicate with a cellular network. The failure may be associated with a minimal time period (for example—more than a minute, more than 15 minutes, more than an hour, or more than any predefined time period) so as to prevent false alerts resulting from temporal loss of communication because of reasons not related to car theft. Additionally or alternatively, the failure may be associated with regions that exhibit poor communication conditions.

Step 512 may be followed by step 514 of evaluating, by the remote computer, a severity of the deviation. There may be two or more than two severity ranges.

The severity of the deviation can be determined using a mapping between a deviation and a severity of the deviation. The mapping can be predetermined, may change over time, and the like. The mapping may be fed to the remote computer and/or may be calculated by the remote computer. The mapping can be updated based upon statistics of previously detected deviations and may also be updated based upon to the responses to deviations.

Step 514 may be followed by step 520 of responding, by the remote computer, by performing different responses when the severity of the deviation is within different ranges. Assuming that there are multiple (N) different severity ranges then the responding can include selecting a response out of N different responses.

The different responses may include notifying different persons. These different persons may include the driver, a vehicle fleet manager, driver's manager, law enforcement units, anti-theft response units (publicly or privately owned), and the like.

According to an embodiment of the invention the response may include performing a validation process during which the remote computer (or any other entity) attempts to verify (or validate) whether the vehicle is really being stolen. The validation process may be dependent upon the severity of the deviation, to the deviation, to the type of the deviation, and the like. Alternatively—the validation process may be indifferent to the severity of the deviation, to the deviation, to the type of the deviation, and the like.

Non-limiting examples of validation processes may include, for example, attempting to communication with the driver (by phone call, emails, SMS or any other communication method), requesting the police or other law enforcement authority to attempt to contact the driver and/or try to track the vehicle.

Car theft alert based communication failure.

In the following text there are provides various non-limiting examples of a first and second communication networks. The first communication network is illustrated as being a cellular network. The second communication network is illustrated as being a local area wireless network (LAWN) communication. These are only non-limiting examples. For example the first and/or second communication networks may be a satellite network, a cellular network and/or a LAWN.

Accordingly—any reference to a cellular transceiver or a LAWN transceiver are examples of first and second transceivers that communicate with the first and second communication networks respectively.

Car theft may include jamming the communication between an anti-theft system and a cellular network—thus preventing the anti-theft system from transmitting alerts over the cellular network.

The anti-theft system may include or may be integrated with a vehicle monitor. According to an embodiment of the invention the vehicle monitor may be equipped with LAWN communication capabilities that facilitate the vehicle monitor to send a car theft alert even when the cellular communication link is jammed.

A non-limiting example of a LAWN is a Wi-Fi compliant network.

Figure 6:
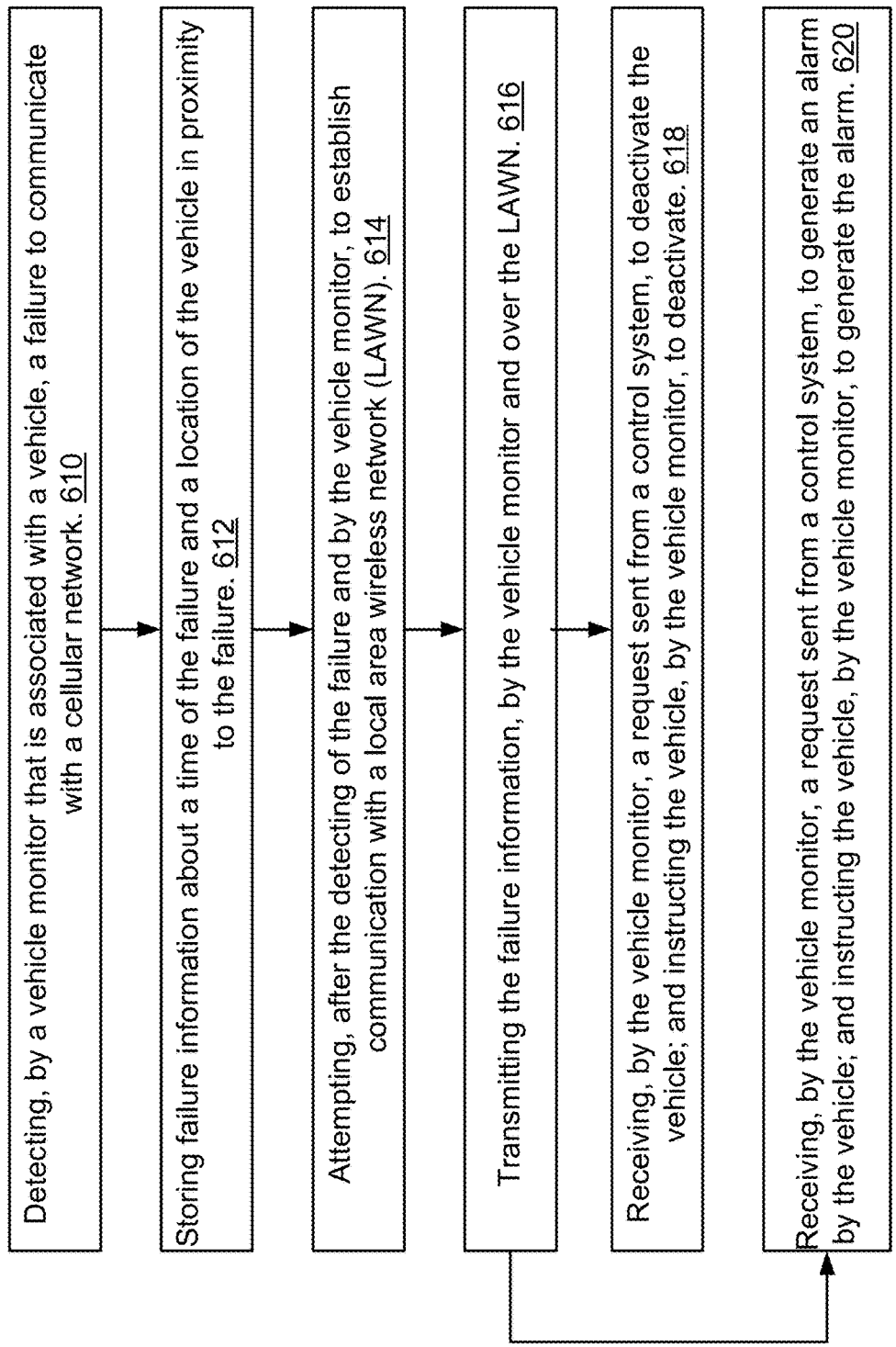
FIG. 6 illustrates a method according to an embodiment of the invention.

FIG. 6 illustrates a method 600 for monitoring a vehicle according to an embodiment of the invention.

Method 600 may be start by step 610 of detecting, by a vehicle monitor that is associated with a vehicle, a failure to communicate with a cellular network.

The detection may include detecting a failure of one or more attempts to establish communication with a cellular network, detecting a jamming signal, and the like.

Step 610 may be followed by step 612 of storing failure information about a time of the failure and a location of the vehicle in proximity to the failure.

There may be a delay between the communication failure and the detection of the communication failure and there may be another delay between the detection of the communication failure and the logging of the time of the failure and/or the location of the vehicle. Thus the timing and location information may reflect a timing and/or location of the vehicle slightly differ from the time of the occurrence of the communication failure (and the location of the vehicle when the communication failure occurred). The proximity refers to these delays and may be of a limited duration that may span between a fraction of a second, a second, one or more seconds, and a fraction of a minute, one or more minutes, and the like.

Step 612 may be followed by step 614 of attempting, after the detecting of the failure and by the vehicle monitor, to establish communication with a local area wireless network (LAWN).

When one or more attempt is successful then step 614 may be followed by step 616 of transmitting the failure information, by the vehicle monitor and over the LAWN.

Step 614 may include activating a LAWN transceiver. The LAWN transceiver may be deactivated until the detection of the communication failure. This may reduce the energy consumption of the vehicle monitor and may, assist in concealing the LAWN capabilities from a thief.

The LAWN can be maintained in a deactivated state or in an active state when the vehicle is ignited.

Step 616 may be followed by deactivating the LAWN transceiver.

Alternatively, the LAWN transceiver may be activated and/or deactivated regardless of the detection of the cellular communication failure and with the successful transmission of the failure information.

The LAWN transceiver can be used for receiving commands such as vehicle deactivation commands, or other commands.

For example, step 616 may be followed by step 618 of receiving, by the vehicle monitor, a request sent from a control system, to deactivate the vehicle; and instructing the vehicle, by the vehicle monitor, to deactivate.

Yet for another example, step 616 may be followed by step 620 of receiving, by the vehicle monitor, a request sent from a control system, to generate an alarm by the vehicle; and instructing the vehicle, by the vehicle monitor, to generate the alarm.

Although method 600 refers to attempting to communicate with the LAWN. Method 600 may also include attempting to communicate with the cellular network. When attempting to communicate with both cellular network and LAWN, the failure information can be sent to the first network (out of the cellular network and LAWN) that facilitates the transmission of the failure information.

The success to transmit the failure information over the first network can be followed by preventing further attempts to communicate the failure information through the second network (out of the cellular network and LAWN) or may be followed by attempting to communicate the failure information through the second network.

Sending the failure information over both LAWN and cellular network may increase the chances of receiving the failure information.

Figure 7:
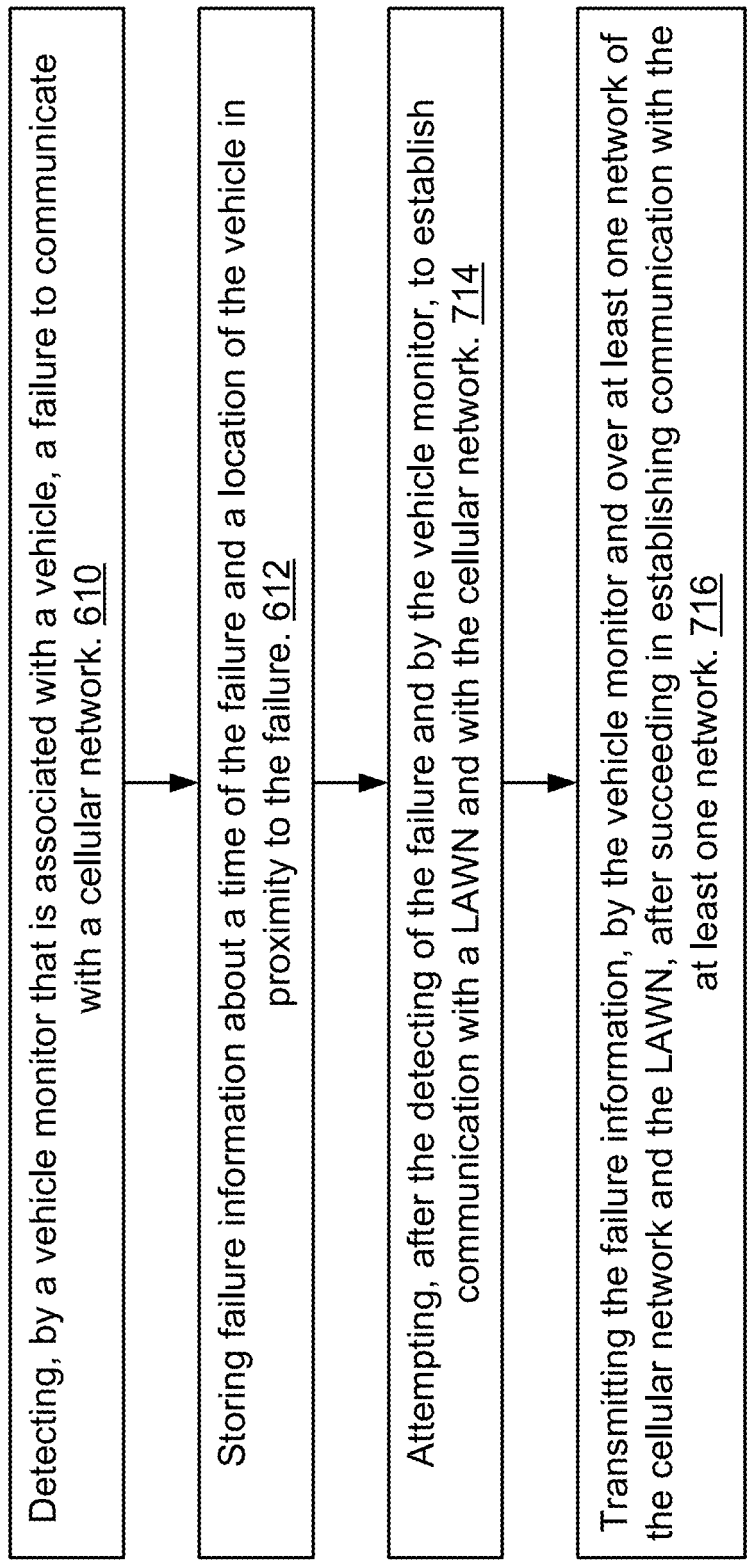
FIG. 7 illustrates a method according to an embodiment of the invention.

FIG. 7 illustrates method 700 according to an embodiment of the invention.

Method 700 may start by step 610 of detecting, by a vehicle monitor that is associated with a vehicle, a failure to communicate with a cellular network.

Step 610 may be followed by step 612 of storing failure information about a time of the failure and a location of the vehicle in proximity to the failure.

Step 612 may be followed by step 714 of attempting, after the detecting of the failure and by the vehicle monitor, to establish communication with a LAWN and with the cellular network.

Step 714 may be followed by step 716 of transmitting the failure information, by the vehicle monitor and over at least one network of the cellular network and the LAWN, after succeeding in establishing communication with the at least one network.

Method 700 may include transmitting the failure information only over a first network, out of the cellular network and the LAWN, with which communication was successfully established. The first network is the first network with which communication was established after the failure.

Figure 8:
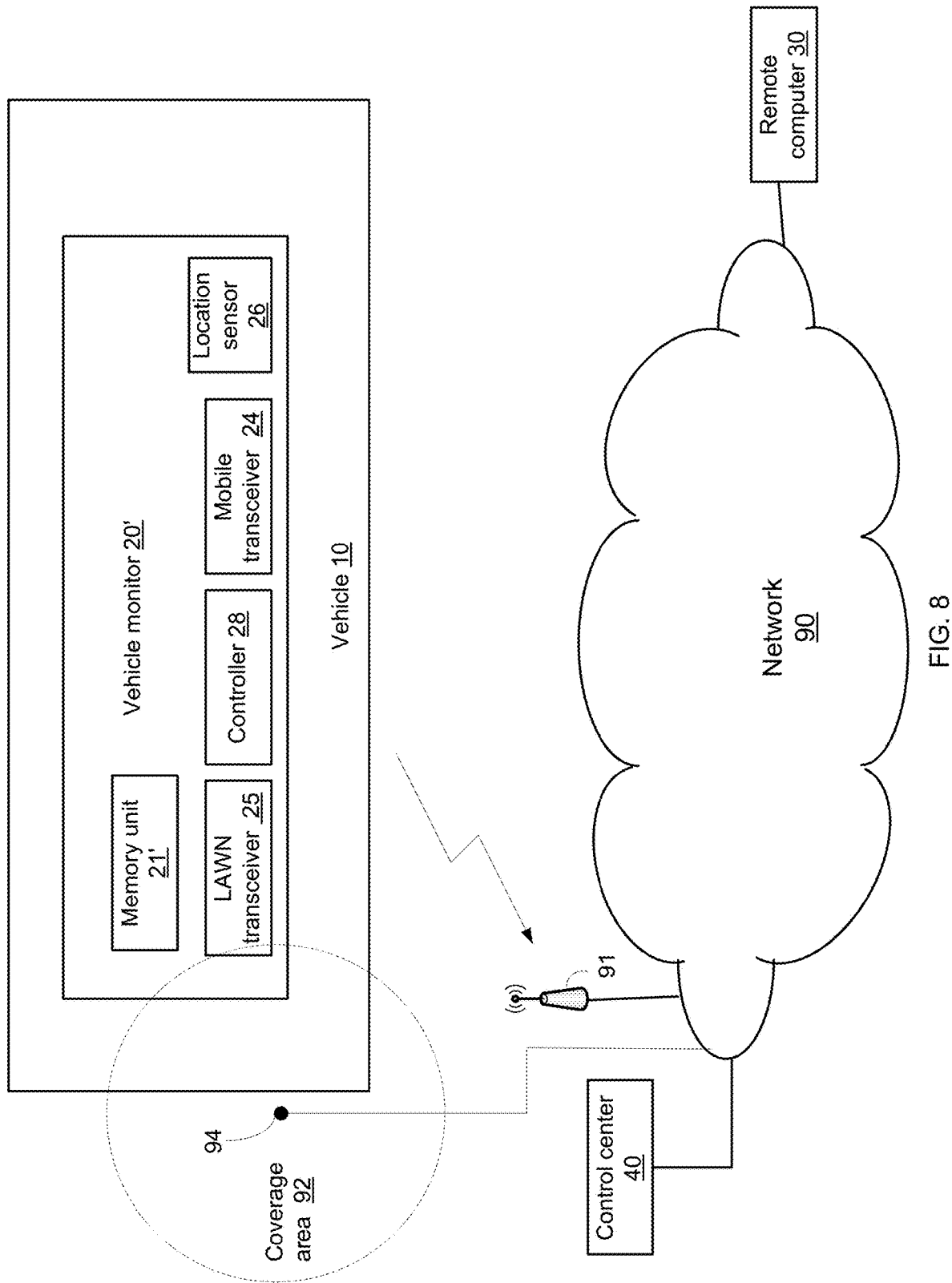
FIG. 8 illustrates a vehicle monitor and its environment according to an embodiment of the invention.

FIG. 8 illustrates a vehicle monitor 20' and its environment according to an embodiment of the invention.

Vehicle monitor 20' is illustrated as included in vehicle 10. Vehicle monitor 20' is configured to communicate (for example—using cellular transceiver 24) with network 90 (for example via network cells 91) that is also coupled to remote computer 30 and control center 40.

Vehicle monitor 20' is illustrated as including memory unit 21', LAWN transceiver 25, controller 28, cellular transceiver 24 and location sensor 26.

Controller 28 is configured to detect a failure to communicate with a cellular network or to receive from the cellular transceiver 24 a failure indication that is indicative of the failure.

Location sensor 26 is configured to generate location information about a location of the vehicle in proximity to a detection of the failure.

Memory unit 21 is configured to store failure information that comprises the location information and timing information that is indicative of a time of the failure.

FIG. 8 also illustrates a LAWN component 94 (such as a Wi-Fi access point) of LAWN that is also coupled to network 90. In FIG. 8 the LAWN transceiver 25 is illustrated as included within the coverage area 92 of LAWN component 94 and thus may establish communication with LAWN component 94.

LAWN transceiver 25 is configured to attempt, after the detecting of the failure, to establish communication with the LAWN and to transmit the failure information over the LAWN, after succeeding in establishing communication with the LAWN.

According to an embodiment of the invention, cellular transceiver 24 is further configured to attempt, after the detecting of the failure, to establish communication with the cellular network and to transmit the failure information over the cellular network, after succeeding in establishing communication with the cellular network.

Figure 9:
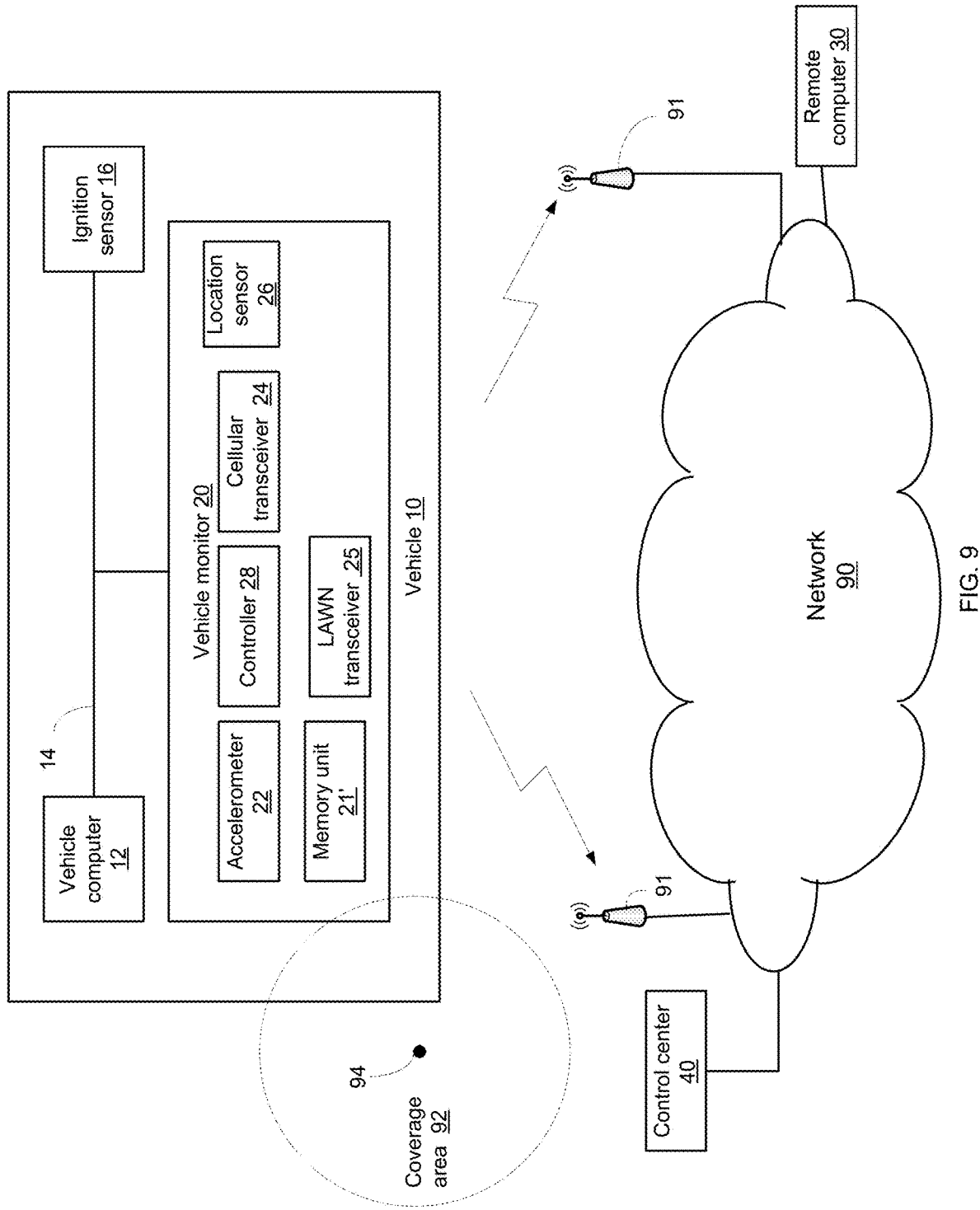
FIG. 9 illustrates a vehicle monitor and its environment according to an embodiment of the invention.

FIG. 9 illustrates a vehicle monitor 20″ and its environment according to an embodiment of the invention.

Vehicle monitor 20″ includes elements of vehicle monitor 20 of FIG. 1 and includes elements of vehicle monitor 20′ of FIG. 8 and is capable of performing both airing-based car theft monitoring and car theft alert based on LAWN communication.

It is noted that any one of the cellular network and the LAWN may be replaced by another network such as a satellite network.

The invention may be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices. Alternatively, the computer system may be implemented by a FPGA.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for monitoring a vehicle, the method comprising:
   determining, by a computer, whether a pairing between a vehicle and a mobile device associated with the vehicle succeeded;
   wherein the determining comprises determining that the pairing failed when at least one out of the following occurred:
      (a) the computer failed to receive a pairing success confirmation within a predefined period after a reception of a vehicle ignition notification;
      (b) the vehicle ignition notification is sent by an ignition sensor of a vehicle monitor that is installed in the vehicle; and
      (c) upon a reception of a pairing failure notification from the mobile device or the vehicle monitor;
   applying, by the computer, a first monitoring process when the pairing succeeded; and
   applying, by the computer, a second monitoring process that differs from the first monitoring process when the pairing failed;
   wherein the applying of the second monitoring process comprises:
      checking an identity of a driver of the vehicle; and
      repetitively changing a position of multiple windows of the vehicle or opening the multiple windows of the vehicle and preventing the multiple windows of the vehicle from closing when an identity is not verified as being an identity of a registered user of vehicle.

2. The method according to claim 1 comprising associating the mobile device with the vehicle before the determining whether the pairing succeeded.

3. The method according to claim 2 wherein the associating comprises maintaining a data structure that stores vehicle identification information and identification information of one or more mobile device associated with the vehicle.

4. The method according to claim 1 wherein the mobile device is a mobile phone of a driver that is associated with the vehicle.

5. The method according to claim 1 comprising receiving, by the computer, information about a location of the vehicle, wherein the information about the location of the vehicle is generated by the vehicle monitor installed in the vehicle; and receiving, by the computer, information about a location of the mobile device associated with the vehicle.

6. The method according to claim 5 wherein the determining whether the pairing succeeded is responsive to a relationship between the location of the vehicle and the location of the mobile device associated with the vehicle of the vehicle.

7. The method according to claim 6 wherein the determining whether the pairing succeeded comprises determining that the pairing failed when a distance between the location of the vehicle and the location of the mobile device associated with the vehicle of the vehicle exceeds a distance threshold.

8. The method according to claim 6 wherein the information about a location of the vehicle comprises an identity of cellular network cells sensed by the vehicle monitor.

9. The method according to claim 1 wherein the applying of the second monitoring process further comprises sending an alert, by the computer to a control center.

10. The method according to claim 1 wherein the applying of the second monitoring process comprises checking whether the vehicle exited a predefined geographical region.

11. The method according to claim 10 comprising generating an alert when the vehicle exited the predefined geographical region.

12. The method according to claim 1 wherein the applying of the second monitoring process comprises notifying a person associated with the vehicle about a failure of the pairing.

13. The method according to claim 1 further comprising disabling the vehicle when the identity is not verified as being the identity of the registered user of vehicle.

14. A non-transitory computer readable medium that stores instructions that once executed by a computer cause the computer to execute the steps of:
   determining whether a pairing between a vehicle and a mobile device associated with the vehicle succeeded;
   wherein the determining comprises determining that the pairing failed when at least one out of the following occurred:
      (a) the computer failed to receive a pairing success confirmation within a predefined period after a reception of a vehicle ignition notification;
      (b) the vehicle ignition notification is sent by an ignition sensor of a vehicle monitor that is installed in the vehicle; and
      (c) upon a reception of a pairing failure notification from the mobile device or the vehicle monitor;
   applying a first monitoring process when the pairing succeeded; and
   applying a second monitoring process that differs from the first monitoring process when the pairing failed;
   wherein the applying of the second monitoring process comprises:
      checking an identity of a driver of the vehicle; and
      repetitively changing a position of multiple windows of the vehicle or opening the multiple windows of the vehicle and preventing the multiple windows of the vehicle from closing when an identity is not verified as being an identity of a registered user of vehicle.

15. The non-transitory computer readable medium according to claim 14 that stores instructions that once executed by the computer cause the computer to execute a step of associating the mobile device with the vehicle before determining whether the pairing succeeded.

16. The non-transitory computer readable medium according to claim 15 wherein the computer is further configured to maintain a data structure that stores vehicle identification information and identification information of one or more mobile device associated with the vehicle.

* * * * *